United States Patent
Bohn et al.

(10) Patent No.: US 10,976,282 B2
(45) Date of Patent: Apr. 13, 2021

(54) VOLTAMMETRY IN HIGH-VOLTAGE FIELDS

(71) Applicants: Paul Bohn, Granger, IN (US); Lawrence Zaino, III, Chapel Hill, NC (US)

(72) Inventors: Paul Bohn, Granger, IN (US); Lawrence P Zaino, III, Chapel Hill, NC (US)

(73) Assignee: The University of Notre Dame du Lac, South Bend, IN (US)

( * ) Notice: Subject to any disclaimer, the term of this patent is extended or adjusted under 35 U.S.C. 154(b) by 321 days.

(21) Appl. No.: 15/461,000

(22) Filed: Mar. 16, 2017

(65) Prior Publication Data
US 2017/0269035 A1 Sep. 21, 2017

Related U.S. Application Data

(60) Provisional application No. 62/309,428, filed on Mar. 16, 2016.

(51) Int. Cl.
*G01N 27/447* (2006.01)
*G01N 27/49* (2006.01)

(52) U.S. Cl.
CPC ... *G01N 27/44791* (2013.01); *G01N 27/4473* (2013.01); *G01N 27/49* (2013.01)

(58) Field of Classification Search
CPC .......... G01N 27/44791; G01N 27/49
See application file for complete search history.

(56) References Cited

U.S. PATENT DOCUMENTS

| 5,194,133 | A | * | 3/1993 | Clark | G01N 30/64 |
| | | | | | 204/403.01 |
| 5,906,723 | A | * | 5/1999 | Mathies | G01N 27/4473 |
| | | | | | 204/601 |
| 6,045,676 | A | * | 4/2000 | Mathies | G01N 27/4473 |
| | | | | | 204/601 |
| 6,159,353 | A | * | 12/2000 | West | G01N 27/4473 |
| | | | | | 204/601 |
| 2003/0213693 | A1 | * | 11/2003 | Selvaganapathy | |
| | | | | | G01N 27/4473 |
| | | | | | 204/452 |
| 2005/0230254 | A1 | * | 10/2005 | Mathies | G01N 27/44791 |
| | | | | | 204/451 |

(Continued)

OTHER PUBLICATIONS

Martin et al. (RS Martin, KL Ratzlaff, BH Huynh, SM Lunte, In-channel electrochemical detection for microchip capillary electrophoresis using an electrically isolated potentiostat, Anal. Chem. 74 (2002) 1136-1143) (Year: 2002).*

(Continued)

*Primary Examiner* — Luan V Van
*Assistant Examiner* — Joshua L Allen
(74) *Attorney, Agent, or Firm* — Greenberg Traurig, LLP

(57) ABSTRACT

Herein are described an instrument and a method for using the same. The instrument comprises a fluid channel fluidly connected to at least a first fluid reservoir and a second fluid reservoir; a counter electrode (CE), a reference electrode (RE), and a working electrode (WE); and a potentiostat. The CE, RE, and WE are all disposed within the fluid channel; the potentiostat is isolated from earth ground by at least one isolator and is powered by a floating power supply; and the CE, RE, and WE are each electrically connected to the potentiostat.

22 Claims, 2 Drawing Sheets

(56) References Cited

U.S. PATENT DOCUMENTS

| | | | | |
|---|---|---|---|---|
| 2008/0283397 | A1* | 11/2008 | Barlag | G01N 27/403 204/403.15 |
| 2012/0024706 | A1* | 2/2012 | Staal | G01N 27/44704 204/601 |
| 2013/0026038 | A1* | 1/2013 | Oliver | G01N 33/48721 204/452 |
| 2013/0087458 | A1* | 4/2013 | Mieda | B01L 3/502715 204/451 |
| 2014/0332410 | A1* | 11/2014 | Ben-Yoav | B01L 3/502707 205/782 |
| 2017/0108485 | A1* | 4/2017 | Slouka | G01N 33/48721 |

OTHER PUBLICATIONS

Chen et al. (C Chen, JH Hahn, Dual-channel method for interference-free in-channel amperometric detection in microchip capillary electrophoresis, Anal. Chem. 79 (2007) 7182-7186) (Year: 2007).*

Gunasekara et al. (DB Gunasekara, MK Hulvey, SM Lunte, In-channel amperometric detection for microchip electrophoresis using a wireless isolated potentiostat, Electrophoresis 32 (2011) 832-837) (Year: 2011).*

Jang et al. (Y-C Jang, SK Jha, R Chand, K Islam, Y-S Kim, Capillary electrophoresis microchip for direct amperometric detection of DNA fragments, Electrophoresis 32 (2011) 913-919) (Year: 2011).*

Kang et al. (CM Kang, S Joo, JH Bae, Y-R Kim, Y Kim, TD Chung, In-channel electrochemical detection in the middle of microchannel under high electric field, Anal. Chem. 84 (2012) 901-907) (Year: 2012).*

Mecker et al. (LC Mecker, RS Martin, Use of micromolded carbon dual electrodes with a palladium decoupler for amperometric detection in microchip electrophoresis, Electrophoresis 27 (2006) 5032-5042) (Year: 2006).*

Lai et al. (CCJ Lai, C Chen, FH Ko, In-channel dual-electrode amperometric detection in electrophoretic chips with a palladium film decoupler, J. Chromatography A, 1023 (2004) 143-150) (Year: 2004).*

Wu et al. (C-C Wu, R-G Wu, J-G Huang, Y-C Lin, H-C Chang, Anal. Chem. 75 (2003) 947-952) disclose an in-channel capillary electrophoresis system (Year: 2003).*

Chen et al. (M-C Chen, H-J Huang, An electrochemical cell for end-column amperometric detection in capillary electrophoresis, Anal. Chem. 67 (1995) 4010-4014) (Year: 1995).*

Contento et al. (NM Contento, PW Bohn, Electric field effects on current-voltage relationships in microfluidic channels presenting multiple working electrodes in the weak-coupling limit, Microfluid Nanofluid, 18 (2015) 131-140) (Year: 2015).*

Kovarik, M. L., Jacobson, S. C., "Nanofluidics in Lab-on-a-Chip Devices", Anal. Chem. (2009),81:7133-7140.

Piruska et al., "Nanofluidics in chemical analysis", Chem. Soc. Rev. (2010) 39:1060-1072.

Gatimu et al., "Nanofluidics and the role of nanocapillary array membranes in mass-limited chemical analysis", Analyst (2006)131:705-709.

Gencoglu, A., Minerick, A. R., "Electrochemical detection techniques in micro- and nanofluidic devices", Microfluid. Nanofluid. (2014) 17:781-807.

Nyholm, L., "Electrochemical techniques for lab-on-a-chip applications", Analyst (2005) 130:599-605.

Rice C. L., Whitehead, R. J., "Electrokinetic Flow in a Narrow Cylindrical Capillary", Phys. Chem. (1965) 69:4017-4024.

Sparreboom et al., "Principles and applications of nanofluidic transport", Nat. Nanotechnol. (2009) 4:713-720.

Tamaki et al., "Pressure-driven flow control system for nanofluidic chemical process", J. Chromatogr. A (2006) 1137:256-262.

Kemery et al., "Electric Field Mediated Transport in Nanometer Diameter Channels", Langmuir (1998) 14:2884-2889.

Piruska et al., "Electrokinetic control of fluid transport in gold-coated nanocapillary array membranes in hybrid nanofluidic-microfluidic devices", Lab Chip (2010) 10:1237-1244.

Haywood et al., "Electroosmotic Flow in Nanofluidic Channels", Anal. Chem. (2014) 86:11174-11180.

Chang et al., "Snapshot Voltammetry Using a Triangular Bipolar Microelectrode", Anal. Chem. (2010) 82:5317-5322.

Chow et al., "A Large-Scale, Wireless Electrochemical Bipolar Electrode Microarray", J. Am. Chem. Soc. (2009) 131:8364.

Mavre et al., "Bipolar Electrodes: A Useful Tool for Concentration, Separation, and Detection of Analytes in Microelectrochemical Systems", Anal. Chem. (2010) 82:8766-8774.

Fosdick et al., "Evaluating Electrocatalysts for the Hydrogen Evolution Reaction Using Bipolar Electrode Arrays: Bi-and Trimetallic Combinations of Co, Fe, Ni, Mo, and W", ACS Catal. (2014) 4:1332-1339.

Perdue et al., "Bipolar Electrode Focusing: The Effect of Current and Electrical Field on Concentration Enrichment", Anal. Chem. (2009) 81:10149-10155.

Branagan et al., "Enhanced Mass Transport of Electroactive Species to Annular Nanoband Electrodes Embedded in Nanocapillary Array Membranes", J. Am. Chem. Soc. (2012) 134:8617-8624.

Gibson et al., "Convective Delivery of Electroactive Species to Annular Nanoband Electrodes Embedded in Nanocapillary-Array Membranes", Small (2013) 9:90-97.

Zaino et al., "Coupled Electrokinetic Transport and Electron Transfer at Annular Nanoband Electrodes Embedded in cylindrical Nanopores", ChemElectroChem (2014) 1:1570-1576.

Lacher et al., "Development of a Microfabricated Palladium Decoupler/ Electrochemical Detector for Microchip Capillary Electrophoresis Using a Hybrid Glass/Poly(dimethylsiloxane) Device", Anal. Chem. (2004) 76:2482-2491.

Mecker, L. C., Martin, R. S., "Use of micromolded carbon dual electrodes with a palladium decoupler for amperometric detection in microchip electrophoresis", Electrophoresis (2006) 27:5032-5042.

Kang et al., "In-Channel Electrochemical Detection in the Middle of Microchannel under High Electric Field", Anal. Chem. (2012) 84:901-907.

Gunasekara et al., "In-channel amperometric detection for microchip electrophoresis using a wireless isolated potentiostat", Electrophoresis (2011) 32:832-837.

Martin et al., "In-Channel Electrochemical Detection for Microchip Capillary Electrophoresis Using an Electrically Isolated Potentiostat", Anal. Chem. (2002) 74:1136-1143.

Forry et al., "Probing Electric Fields Inside Microfluidic Channels during Electrosmotic Flow with Fast-Scan Cyclic Voltammetry", Anal. Chem. (2004) 76:4945-4950.

Wallenborg et al., "End-Column Amperometric Detection in Capillary Electrophoresis: Influence of Separation-Related Parameters on the Observed Half-Wave Potential for Dopamine and Catechol", Anal. Chem. (1999) 71:544-549.

Contento et al., "Electric field effects on current-voltage relationships in microfluidic channels presenting multiple working electrodes in the weak-coupling limit", Microfluid. Nanofluid. (2015) 18:131-140.

Bard, A.J., Falukner, L.R., Electrochemical Methods: Fundamentals and Applications, 2nd ed. Wiley:New York (2001).

Faulkner et al., "New Instrumental Approaches to Fast Electro-Chemistry at Ultramicroelectrodes", In: Ivaska A., Lewenstam A., Sara R. (eds), Contemporary Electroanalytical Chemistry, Springer, Boston, MA (1990), pp. 5-14.

Sun, L., Crooks, R. M., "Photonic Reporting of Electrochemical Reactions Using Light-Emitting Diodes", J. Electrochem. Soc. (2005) 152:E371-E377.

\* cited by examiner

VOLTAMMETRY IN HIGH-VOLTAGE FIELDS

CROSS-REFERENCE TO RELATED APPLICATIONS

This application claims the benefit of, and priority to, U.S. Provisional Application Ser. No. 62/309,428, filed Mar. 16, 2016, which is incorporated herein in its entirety.

STATEMENT REGARDING FEDERALLY SPONSORED RESEARCH OR DEVELOPMENT

This invention was made with Government support under grant CHE 1404744, awarded by the National Science Foundation. The U.S. government has certain rights in the invention.

BACKGROUND

Field

The present disclosure relates to an instrument and method for performing electrochemistry.

Description of Related Art

The ability to perform electrochemical detection in the presence of large voltages and electric field magnitudes without concern for the local potential has many possible applications in micro/nanofluidic assays and in capillary electrophoresis. Traditionally, electrochemical detection (also, "electrochemistry" herein) in the presence of significant external electric fields has been dominated by end-channel detection for capillary and microchip electrophoresis detection.

A second, common, approach to performing electrochemical measurements in large electric fields is to utilize bipolar electrodes (BPEs), i.e., electrically floating metal electrodes placed in the high-field environment, which drive electrochemical reactions based on the local potential difference between the electrode and solution. BPEs have been used for redox reactions as diverse as electrogenerated chemiluminescence and silver dissolution and have been used for applications like catalyst evaluation and concentration enrichment. Another structure-based strategy to couple electrochemistry with electrokinetic flow involves nanostructured solid-state architectures with arrays of nanocapillaries presenting embedded annular electrodes. These embedded annular nanoband electrode arrays achieve high fields at low voltages by placing the working electrode a few μm from the counter electrode and, thus, support electrokinetically-driven enhanced mass transport for electrochemical processing.

Lunte, Martin, Wightman and others have pioneered a variety of strategies for in-channel electrochemical detection at high fields, for example, in microchip capillary electrophoresis applications. These include decoupling the electric field, dual-channel detection, and the development of isolated potentiostats. Previous iterations of isolated potentiostats have allowed in-channel detection in external electric fields by placing the working electrode (WE) in-channel, while the reference (RE) and counter (CE) electrodes are placed in a field-free volume, for example, in the buffer well at ground potential. While this works very well and is straightforward to fabricate, it limits the placement of the WE, because of iR-derived shifts in the actual potential, $$E_{Actual} = E_{Applied} - iR \qquad (1).$$

As the WE is moved further into the channel, the iR drop increases, causing large shifts in the actual potential at the WE compared to the nominal applied potential. This presents unique challenges for designing electrochemical devices, which incorporate electrokinetic flow. Decoupling the WE from the field in the microchannel greatly mitigates problems with iR drop and voltage shifts, but at the expense of increased dead volume and degraded peak shapes. In addition, some previous approaches have grounded the RE, but this would clearly present problems if the RE is placed in the middle of a channel at high voltage.

Ideally, one would like to perform voltammetry, as opposed to measurements at a single potential, in LOC devices and to do it independent of local potential or field strength, without shifting the observed potential of the voltammetric features. Approaches to this ideal have been achieved in certain special cases. For example, mid-channel detection has been demonstrated at field strengths up to 400 V cm$^{-1}$ by incorporating a polyelectrolyte gel salt bridge into a microfluidic device to separate the WE in the channel from the RE and CE.

SUMMARY

The present disclosure is based, at least in part, on the observation that current instrumental designs are unable to integrate in-channel electrochemical detection strategies with the large external electric fields needed to drive electrokinetic fluid flow through micro- and nano-channels.

Accordingly, disclosed herein is an instrument and a method for using the same. The instrument is capable of performing electrochemistry in high voltage fields using a isolated, floating potentiostat. The instrument comprises the typical components of a capillary electrophoresis device, including a fluid channel fluidly connected to at least a first fluid reservoir and a second fluid reservoir. It additionally comprises an electrically isolated potentiostat, which is electrically connected to at least a counter electrode (CE), a reference electrode (RE), and a working electrode (WE); and a potentiostat.

DETAILED DESCRIPTION

Figure 1:
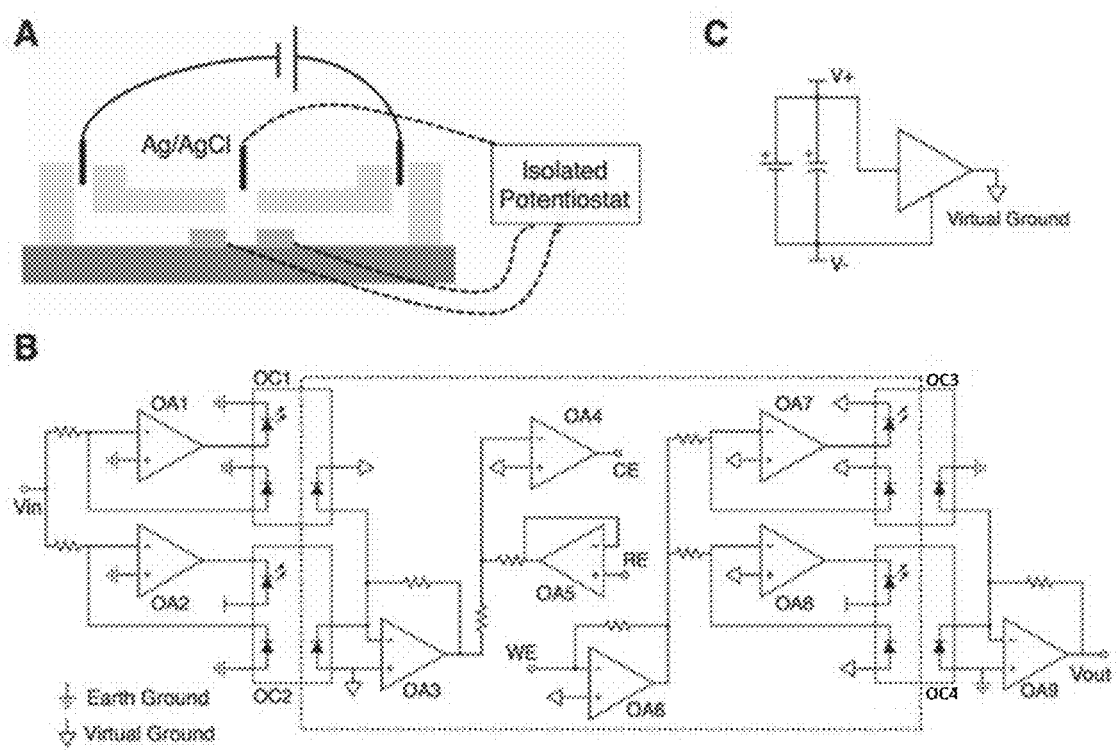
FIG. 1: (A) Schematic illustration of the positioning of the working and counter electrodes relative to the electrified channel. (B) Circuit diagram of the optically isolated potentiostat. The components in the dashed box, OA3-OA8, are referenced to a virtual ground that can be set as desired and powered by a battery-driven supply, based on a TLE 2426, shown in (C). The small rectangular boxes straddling the dashed rectangle represent four integrated optocouplers, OC1-OC4.

The present disclosure is based, at least in part, on the observation that current instrumental designs are unable to integrate in-channel electrochemical detection strategies with the large external electric fields needed to drive electrokinetic fluid flow through micro- and nano-channels.

Accordingly, disclosed herein is an instrument and a method for using the same. The instrument comprises a fluid channel fluidly connected to at least a first fluid reservoir and a second fluid reservoir; a counter electrode (CE), a reference electrode (RE), and a working electrode (WE); and a potentiostat. The CE, RE, and WE are all disposed within the fluid channel; the potentiostat is isolated from earth ground by at least one isolator and is powered by a floating power supply; and the CE, RE, and WE are each electrically connected to the potentiostat.

In the past decade, (LOC) devices have rapidly evolved to demonstrate a multitude of analytical applications, and there is great interest in developing electrochemical techniques in both micro- and nanofluidic LOC devices. While pressure-driven flow is suitable for microfluidic devices in general, both microchip electrophoresis and devices with smaller dimensions (nanofluidics) require that pressure-driven flow be replaced by electrokinetic flow. The Hagen-Poiseuille equation dictates that the pressure needed to drive laminar flow scales like $d^{-4}$ where d is the channel diameter, meaning that the pressure needed to drive flow becomes excessively large for many nanofluidic applications. Utilizing electrokinetic flow to manipulate solutions in nanochannel-based devices overcomes this problem. In addition, electro-osmotic flow is required intrinsically in microchip electrophoresis. However, integrating electrochemical detection strategies with the large external electric fields, $E \sim 10^3 V$ $cm^{-1}$, needed for electrokinetic flow creates a number of issues, including solvent electrolysis, electrodissolution, electrode instability, and damage to the potentiostat used to control the voltammetry.

The results described herein are achieved with a true reference electrode without large shifts in the apparent reduction potential. At the price of a small increase in the complexity of the instrumentation, the performance characteristics of electrochemical detection in microchip and capillary electrophoresis are greatly extended, making it possible to incorporate electrochemical detection with electrokinetic flow-based LOC devices in a large number of possible device configurations.

Here we describe instrumentation for integrating a three electrode cell into external electric fields regardless of location in the channel. This is accomplished through two advances: (1) a custom, optically isolated, potentiostat, which allows the WE and CE to be placed at arbitrary locations directly in the external electric field, regardless of local potential and field strength, and (2) placing the RE just above the in-channel WE/CE pair with electrical communication established through a small access hole.

Optically isolating the potentiostat allows the virtual ground to float to the local potential of the reference electrode and makes it possible to obtain well-behaved voltammetry at local potentials approaching 1500 V and at field strengths up to 3000 V $cm^{-1}$. Using this configuration, cyclic voltammetry can proceed without significant shifts in the half-wave potential at working electrodes at local potentials up to ~1500 V and field strengths of up to 3000 V $cm^{-1}$, using a standard Ag/AgCl reference electrode. We show that the custom potentiostat circuitry described herein is capable of monitoring faradaic electron transfer at local potentials up to 1500 V and field strengths of 3000 V $cm^{-1}$.

As used herein, an "instrument" is a tool or implement designed to perform electrochemical detection to identify analytes, solutes, or particles in solution.

In some embodiments, an instrument can perform electrochemical detection after electrokinetic separation has been used to separate analytes, solutes, or particles in a solution. In some embodiments, electrokinetic separation can be accomplished by capillary electrophoresis. Capillary electrophoresis is a technique which separates ions (analytes, solutes, or particles) based on their electrophoretic mobility in an applied voltage.

In one embodiment a capillary electrophoretic device comprises at least a first fluid reservoir disposed on a first end of a fluid channel, and a second fluid reservoir disposed on a second end of a fluid channel. In some embodiments, the first fluid reservoir, the second fluid reservoir, and the fluid channel are all fluidly connected, meaning that a fluid can flow freely from the first fluid reservoir, through the fluid channel, and into the second fluid reservoir without impediment or leaking from the system.

The first fluid reservoir can comprise a fluid. In some embodiments, the fluid can be a solvent. The first fluid reservoir can comprise a solvent which itself comprises other chemicals, such as solutes, particles, or small molecules. The solutes, particles, or small molecules can be of interest, for example, of interest because they need to be identified.

The second fluid reservoir can comprise a fluid. In some embodiments, the fluid can be a solvent. The second fluid reservoir can comprise a solvent which itself comprises other chemicals, such as solutes, particles, or small molecules. The solutes, particles, or small molecules can be of interest, for example, of interest because they need to be identified.

The fluid channel can comprise a fluid. In some embodiments, the fluid can be a solvent. The fluid channel can comprise a solvent which itself comprises other chemicals, such as solutes, particles, or small molecules. The solutes, particles, or small molecules can be of interest, for example, of interest because they need to be identified.

The fluid comprised by the first fluid reservoir, second fluid reservoir and fluid channel can be the same or different fluids at any point during the use of the capillary electrophoresis device. For example, the fluid in the first fluid reservoir, second fluid reservoir and fluid channel can, at the beginning of an experiment, all be the same; that is, the fluid is homogeneous regarding the amounts of any of solvent, solute and analyte which it comprises. By the end of the experiment, however, the fluid in the the first fluid reservoir, second fluid reservoir and fluid channel can be materially different from one another, due to the chemical reactions which have taken place in the capillary electrophoretic device.

The fluid channel can be, in some embodiments, a capillary tube. The fluid channel can be, in some embodiments, the flow channel of a lab-on-a-chip (LOC). The fluid channel can be, in yet other embodiments, any arbitrary shape and length, as long as the fluid channel has an appropriately-sized internal diameter (or cross-section). The internal diameter of the fluid channel can be a sub-millimeter diameter. For example, in some embodiments, a fluid channel can have a diameter of at least about 100 μm, 90 μm, 80 μm, 70 μm, 60 μm, 50 μm, 40 μm, 30 μm, 20 μm, or 10 μm. A fluid channel can have a diameter of 1 μm. In some embodiments, a fluid channel can have a diameter of 900 nm, 800 nm, 700 nm, 600 nm, 500 nm, 400 nm, 300 nm, 200 nm, or 100 nm. A fluid channel can have a diameter of 90 mn, 80 nm, 70 nm, 60 nm, 60 nm, 50 nm, 40 nm, 30 nm, 20 nm, or 10 nm. The length of the fluid channel can be, in the case of a capillary tube, on the order of meters; for example about 5 m, 4.5 m, 4 m, 3.5 m, 3 m, 2.5 m, 2 m, 1.5 m, or 1 m. The length of the fluid channel can be, in the case of a microfluidic chip, on the order of centimeters; for example 5 cm, 4 cm, 3 cm, 2 cm, or 1 cm; 900 mm, 800 mm, 700 mm, 600 mm, 500 mm, 400 mm, 300 mm, 200 mm, or 100 mm; 10 mm, 9 mm, 8 mm, 7 mm, 6 mm, 5 mm, 4 mm, 3 mm, 2 mm, or 1 mm.

In some embodiments, the fluid channel can be made from a material which is an electrical insulator. An electrical insulator can be a material whose internal electric charges do not flow freely. An electrical insulator is capable of allowing very little, or no, electric current to flow through it under the influence of an electric field. In some embodiments, the insulator from which the fluid channel can be made is polymer. In some embodiments the polymer can be an organosilicon polymer, such as PDMS (polydimethylsiloxane), or an organic polymer such as polycarbonate or polymethylmethacrylate. In some embodiments, the insulator is an epoxy. In some embodiments, the insulator is glass. In some embodiments the insulator is fused silica. In some embodiments, the insulator is PDMS (polydimethylsiloxane).

In some embodiments, the capillary electrophoretic device can comprise a first lead. The first lead can be disposed in a first fluid reservoir. The first lead can be in contact with a fluid in the first fluid reservoir, for example a solvent. In some embodiments, the capillary electrophoretic device can comprise a second lead. The second lead can be disposed in a second fluid reservoir. The second lead can be in contact with a fluid in the second fluid reservoir, for example a solvent. Each of the first and second lead can be electrically conductive. It will be understood by those of skill in the art that the first lead and the second lead can comprise any electrically conductive material suitable to conduct current. For example, a lead can comprise platinum, gold, silver, or copper.

The first lead and the second lead, each in contact with fluid, and in electrical connection through the fluid in the fluid channel, can create a high-voltage electric field between the leads in the two fluid reservoirs and across the fluid channel. In some embodiments, the high-voltage electric field can be a field of about 100 Vcm$^{-1}$, 200 Vcm$^{-1}$, 300 Vcm$^{-1}$, 400 Vcm$^{-1}$, 500 Vcm$^{-1}$, 600 Vcm$^{-1}$, 700 Vcm$^{-1}$, 800 Vcm$^{-1}$, 900 Vcm$^{-1}$, 1000 Vcm$^{-1}$, 1100 Vcm$^{-1}$, 1200 Vcm$^{-1}$, 1300 Vcm$^{-1}$, 1400 Vcm$^{-1}$, 1500 Vcm$^{-1}$, 1600 Vcm$^{-1}$, 1700 Vcm$^{-1}$, 1800 Vcm$^{-1}$, 1900 Vcm$^{-1}$, 2000 Vcm$^{-1}$, 2100 Vcm$^{-1}$, 2200 Vcm$^{-1}$, 2300 Vcm$^{-1}$, 2400 Vcm$^{-1}$, 2500 Vcm$^{-1}$, 2600 Vcm$^{-1}$, 2700 Vcm$^{-1}$, 2800 Vcm$^{-1}$, 2900 Vcm$^{-1}$, 3000 Vcm$^{-1}$, 3100 Vcm$^{-1}$, 3200 Vcm$^{-1}$, 3300 Vcm$^{-1}$, 3400 Vcm$^{-1}$, or 3500 Vcm$^{-1}$.

In some embodiments, electrochemical detection can use a potentiostat to perform the electrochemical detection. In some embodiments, a potentiostat is the electronic hardware which can runs a three-electrode cell, which cell can comprise a counter electrode (CE), a working electrode (WE), and a reference electrode (RE) all electrically connected to the potentiostat. A potentiostat can function by maintaining the potential of the WE as constant with respect to the RE, by adjusting the current at an auxiliary electrode.

The CE, RE, and WE can all be disposed within the fluid channel. The CE, RE, and WE can all be disposed at any position within the fluid channel. The CE, RE, and WE can be disposed significantly away from any end of the fluid channel. For example, the CE, RE, and WE can be disposed at any position in which they can be placed, either during or after the fabrication of the fluid channel. In some embodiments, the CE and WE can be fabricated on a wall of the fluid channel, and an opening created in an opposite wall of the fluid channel, which opening can receive the RE. These fabrications and openings can be placed at any position in the fluid channel which is of interest to a user. Such positions can include, but are not limited to, the midpoint of the fluid channel (ie, midway between two ends of the fluid channel); a distance at least a quarter of the length of the fluid channel away from an end of the fluid channel; or at any other position along the length of the fluid channel.

In some embodiments, the CE can comprise Ti, Au, Pt, C, or Ag. In some embodiments, the RE can comprise Ti, Au, Pt, C, or Ag. In some embodiments, the WE can comprise Ti, Au, Pt, C, or Ag. In some embodiments, any or all of the CE, RE, and WE can comprise any or all of Ti, Au, Pt, C, or Ag. In a specific embodiment, the CE can be a Ag/AgCl electrode. In a specific embodiment, the RE can be a Ag/AgCl electrode. In a specific embodiment, the WE can be a Ag/AgCl electrode. In some embodiments, the CE can be up to about 500 µm wide, 400 µm wide, 300 µm wide, 200 µm wide, 100 µm wide, 50 µm wide, 40 µm wide, or 30 µm wide. In some embodiments, the RE can be up to about 500 µm wide, 400 µm wide, 300 µm wide, 200 µm wide, 100 µm wide, 50 µm wide, 40 µm wide, or 30 µm wide. In some embodiments, the WE can be up to about 500 µm wide, 400 µm wide, 300 µm wide, 200 µm wide, 100 µm wide, 50 µm wide, 40 µm wide, or 30 µm wide. In some embodiments, the CE can be up to about 500 nm tall, 400 nm tall, 300 nm tall, 200 nm tall, 100 nm tall, or 50 nm tall. In some embodiments, the RE can be up to about 500 nm tall, 400 nm tall, 300 nm tall, 200 nm tall, 100 nm tall, or 50 nm tall. In some embodiments, the WE can be up to about 500 nm tall, 400 nm tall, 300 nm tall, 200 nm tall, 100 nm tall, or 50 nm tall.

In some embodiments, the CE, RE, and WE can be all disposed within about 3 mm of each other, 2 mm of each other, 1 mm of each other, or 0.5 mm of each other. In some embodiments, the CE and WE can be disposed on one contiguous surface which defines a wall of the fluid channel, while the WE can be disposed within the fluid channel, unattached to any wall of the fluid channel. Alternatively, the the CE and WE can be disposed on one contiguous surface which defines a wall of the fluid channel, while the RE can be inserted into the fluid channel through an opening within a wall of the fluid channel. In any configuration, the CE and WE can be disposed approximately on the opposite end of a diameter of the fluid channel from the RE.

The electrical circuit comprising a potentiostat can additionally comprise fluid. The fluid can comprise electrolytes. The fluid can be a solvent. The fluid can be the same fluid as is present in the first fluid reservoir, fluid channel, or second fluid reservoir. The electrical circuit defined by a potentiostat can additionally comprise an analyte, solute, or particle. A potentiostat can comprise operational amplifiers (op amps, or OA).

As used herein, an isolator can be an electrical isolator, that is, a component of an instrument or a device which has the ability to couple one circuit to another circuit without the use of direct wire connections. An isolator can be used to isolate or separate high voltage and low voltage circuits. An isolator can be, without limitation, a galvanic isolator. Optoisolator, optocoupler, isocoupler, and a photocoupler are examples of galvanic isolators, and these terms are used interchangeably herein to describe this type of isolator. A solid state relay and a transformer are additional non-limiting examples of galvanic isolators. Isolators can also be short range wireless communications devices, such as Bluetooth, radio transmission, or Wifi.

Two or more isolated sections of electrical systems can remain in communication by means other than direct electrical connection. Such communication can be provided by capacitance, induction waves, electromagnetic waves, optical methods, acoustic methods, or mechanical methods.

In some embodiments, an instrument capable of performing capillary electrophoretic detection can comprise an isolated potentiostat. That is, an instrument capable of performing capillary electrophoretic detection can have two different ground reference points: one portion of the device can be referenced to earth ground, while a second, isolated, portion of the device can be referenced to a different circuit ground. In a specific embodiment, the potentiostat can be referenced to a circuit ground, while the rest of the instrument capable of performing capillary electrophoretic detection can be isoloated from the potentiostat, and referenced to earth ground.

In some embodiments, an isolated portion of an instrument capable of performing capillary electrophoretic detection can be powered separately from the rest of the device. Such a separate power supply can be a floating power supply, such as a battery. Any type of battery, so long as it is isolated from earth ground, can be used as a floating power supply. Suitable types of batteries for use as the power supply, include, but are not limited to a wet cell or dry cell, or a molten salt battery; a solid-state battery; or a primary or secondary cell. Such a battery can be of any material suitable for such a use, including but not limited to Ni or Li. In some embodiments, any voltage of battery suitable for the purpose can be used, including but not limited to any commercially available voltage of battery such as 1.2V, 1.5V, 3V, 3.7V, 9V, or 12.6V. A battery is suitable for the purpose intended herein if it is capable of creating a voltage differential sufficient for the detection of a solute or analyte of interest within a solution. In some embodiments, the isolated portion of the instrument capable of performing capillary electrophoretic detection is a potentiostat. In a specific embodiment, the potentiostat can be powered by a battery, for example a 9V battery.

EXAMPLES

Example 1

Reagents and Materials

Potassium ferricyanide (Fischer) and sodium phosphate (monobasic and dibasic, Sigma-Aldrich) were purchased and used as received. Deionized (DI) water (R~18 MΩ cm) from a milli-Q Gradient water purification system (Millipore) was used to prepare all solutions. Rapid prototyping was performed using p-type <100> Si wafers and SU-8 photoresist (MicroChem). Poly(dimethylsiloxane) (Sylgard 184, Dow Corning) was used to create microchannels. Electrodes were patterned on glass slides using S 1813 (MicroChem) and AZ917-MIF developer (AZ Electronic Materials).

Example 2

Fabrication

Metal electrodes were patterned by photolithography on glass slides. After photoresist development, an electron beam evaporator was then used to deposit Ti and Au at a thickness of 5-10 nm and 150 nm, respectively. The WE and CE were 50 μm and 100 μm wide, respectively, and separated by 200 μm. Microchannels were fabricated by first creating a master mold using Si wafers and SU-8. PDMS was then poured over the master, cured at 75° C., and placed onto the wafer to produce 2.4 cm long microchannels of 100 μm width and height. A 0.75 mm diameter punch was used to create an access hole for the Ag/AgCl reference electrode (RE). Oxygen plasma sealing was used to bind the PDMS to the wafer.

Example 3

Optically Isolated Potentiostat

The isolated potentiostat was constructed starting from a traditional potentiostat design. Bipolar optical isolation circuitry was built using HCNR200 optical couplers (Avago Technologies) using a dual optocoupler design according to manufacturer guidelines. The potentiostat and isolation circuitries were built using LT1097 operational amplifiers (Linear Technology). The isolated components of the instrument were battery powered using a TLE2426 rail-splitter with a virtual ground. The circuit components were not optimized for low noise measurements. Non-isolated components were powered using a ±15 V DC power supply. The magnitude, scan rate and limits of triangular waveform were set using a custom Lab View program. Data acquisition was also performed using Lab View (2014, National Instruments). A data acquisition (DAQ) card (PCie-6361, National Instruments) capable of both signal generation and measurement was used to interface between the isolated potentiostat and Lab View. A data acquisition rate of 60 Hz was used. The external electric field was applied using 0.25 mm diameter Pt electrodes with a high voltage power supply (Bertan, 602c-30P). The experimental configuration and circuits are shown in FIG. 1.

Example 4

Instrument Design Considerations

Traditional potentiostats cannot be used to conduct electrochemistry at high voltage due to solvent electrolysis, electrode degradation, and possible instrument damage—all driven by the large voltage difference between the solution environment and the potentiostat components, which are typically referenced to earth ground. The potentiostat design described here for high-voltage/high-field voltammetry experiments is based on a traditional configuration but includes important modifications in order to allow electrochemical measurements at high voltage. In particular, the current follower circuit, which is used to measure the current though the WE in traditional potentiostat designs, is referenced to virtual earth ground by the operational amplifier (op-amp, also OA), OA6. Thus, if a large positive voltage is applied across a fluidic channel, any WE in the fluidic channel with a with a small applied potential ($|E_{we}|<1V$) will experience a negative voltage offset in relation to the solvent and, thus, will function as a cathode, passing large ohmic currents. Under these conditions, the overpotential for water electrolysis could easily exceed 100 V, which would cause significant gas formation and likely destroy the electrode. Thus, in order to function at high voltage, the potentiostat circuitry must be designed to prevent solvent electrolysis and electrode degradation, while allowing faradaic electron transfer. In addition, as is typical in most LOC devices, we utilize thin film electrodes, which are especially susceptible to damage when large currents are passed though them. In order to prevent solvent electrolysis and possible damaging effects to the electrodes or instrument, the inverting inputs of both the control amplifier, OA4, and current follower, OA6, in FIG. 1B have to be addressed.

The solution we have developed is to allow the inverting inputs of the op-amps constituting the WE current follower, OA6, and CE control amplifier, OA4, to float to the local potential of the electrified fluid. The simplest way to allow the components, OA6 and OA4, to float to the local potential is though a battery-based power supply illustrated in FIG. 1C, rather than using a traditional power supply referenced to earth ground. A battery-based powered supply provides the offset isolation required to protect the potentiostat circuitry. In this case, a rail-splitter circuit was used in conjunction with a 9V battery to power the potentiostat. This custom power supply provides ca. +4.5 V and −4.5 V with respect to virtual ground, where virtual ground is equivalent to the local potential in the electrified fluid. The virtual ground of the supply is equal to the local potential, because the negative-feedback loop of the op-amp equalizes the voltage of the inverting and non-inverting leads, while the virtual ground floats to the local potential of the electrodes. For example, when the electrodes are at a local potential of ~50 V the absolute potential of the virtual ground of the power supply is ~50 V with respect to earth ground. The rail-splitter circuit supplies sufficient current, up to 20 mA, at a stable voltage level, which a battery alone would not provide.

The modifications described herein effectively isolate the potentiostat, but further work is needed to address the incoming and outgoing analog signals. Typically, the potentiostat supplies and reads two analog voltages: an incoming applied potential waveform, e.g., triangular waveform for cyclic voltammetry, and a voltage which is proportional to the faradaic current, iR where i is the WE current, and R is the resistance of the current follower resistor. Both of these voltages are traditionally applied and measured with respect to earth ground, or a virtual ground that is actively maintained in close proximity to earth ground by a negative-feedback OA circuit loop. Since the potentiostat is no longer referenced to earth ground, the circuitry must be isolated from earth ground. This is accomplished though optical isolation with four optocoupler (OC) circuits, OC1 to OC4 in FIG. 1B. The optocouplers transmit analog signals from an LED to a photodiode. Using two optocoupler circuits in conjunction with the battery-based power supply effectively decouples the potentiostat completely from earth ground. A similar approach has been used to amplify electrochemical reactions by coupling the electrochemical measurement to LEDs. The complete circuit allows the WE, CE and RE to be placed in an external electric field and to control electrochemical reactions at arbitrary local voltages and fields. Critical to this measurement approach is that electrochemical reactions are driven by local potential differences across the WE-solution interface, rather than absolute potential with respect to earth ground, a fact that has been abundantly demonstrated in bipolar electrochemistry.

Example 5

Cyclic Voltammetry in High Voltage Electric Fields

Figure 2:
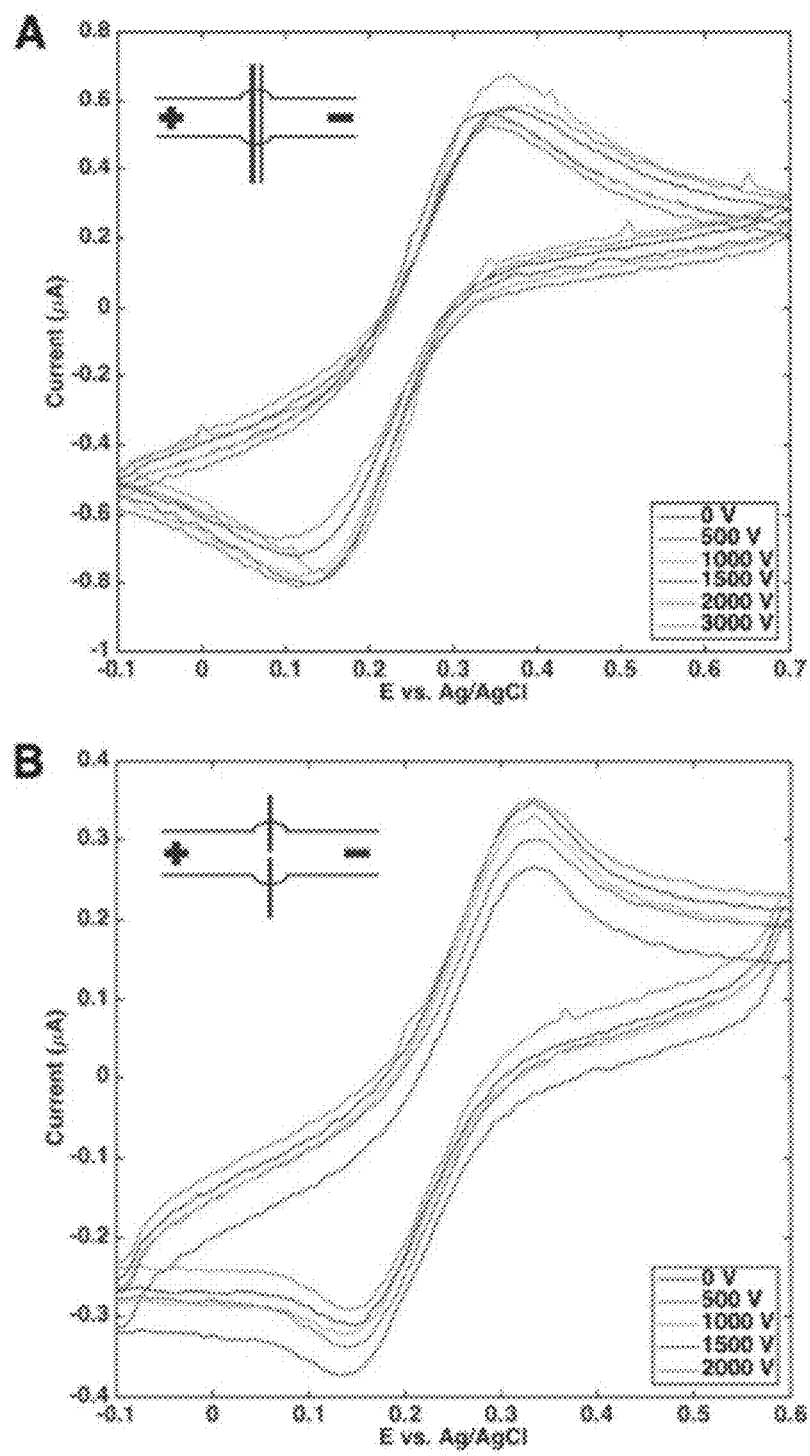
FIG. 2: Cyclic voltammograms obtained from 5 mM K$_3$[Fe(CN)$_6$] in 100 mM phosphate buffer at hP 6.9 with externally applied voltages ranging from 0-3000V. (A) 1 cm length channel with parallel WE and CE. (B) 1.2 cm length channel with opposing WE and CE. In both cases, an Ag/AgCl reference electrode is placed in a 660 μm diameter well above the CE and WE. (Insets) Schematic illustration of the WE and CE relative positions.

Cyclic voltammetry was performed with a solution of 5 mM $K_3[Fe(CN)_6]$ in a pH 6.9 100 mM phosphate buffer under active potential control in electrified fluids with external voltages ranging from 0 V to 3000 V, as shown in FIG. 2. The buffer pH was chosen to minimize electroosmotic flow in order to simplify interpretation of the results. The effects of the external voltage field are minimal as illustrated in FIGS. 2A and 2B. The data in FIG. 2A were acquired with the WE and CE electrodes configured in a side-by-side configuration, with the WE and CE 50 μm and 100 μm wide, respectively, and 200 μm apart. The data in FIG. 2B were acquired with the WE and CE in an opposed configuration, as shown in the inset, with 50 μm wide WE and CE, 50 μm apart. The electrode cell was placed approximately in the middle of the 1 cm long microchannel, although the electrochemical response was determined to be independent of its position along the channel. These experiments show that voltammetry can be successfully performed while the three electrode cell is in a large electric field. In both configurations, the highest external potentials reached were limited by electrical breakdown, not by any limitation imposed by the potentiostat. We hypothesize that with more careful design of the connections, the instrument could function at local potentials up to 5 kV, which is the breakdown voltage of the isolation circuitry. In the case of in-line electrodes, FIG. 2A, only minor shifts (≤50 mV) in the half wave potential are observed, while no shifts at all are observed in the opposed configuration explored in FIG. 2B. The slightly larger than normal peak separation, $\Delta E_p$ is likely due to the distance between WE and RE, which is much larger than the distance between WE and CE. The slight difference in performance is likely due to the geometry of the cell, particularly having WE and CE directly opposed keeps both at the same local potential. In addition, placing the Ag/AgCl RE directly above the WE and CE by using a small access hole also keeps the RE at the same local potential. This eliminates the larger shifts in half-wave potential that are typically observed with electrochemical detection in microchip capillary electrophoresis using the end-channel configuration, where increasing shifts in half-wave potential are observed as the WE is moved further into the channel. Thus, by eliminating the need to place the WE at the end of the channel and RE/CE in the grounded well, a large number of previously untenable device deigns are accessible.

The articles "a" and "an" are used herein to refer to one or to more than one (i.e., to at least one) of the grammatical object of the article. By way of example, "an element" means one element or more than one element.

The term "or" is used herein to mean, and is used interchangeably with, the term "and/or," unless context clearly indicates otherwise.

The term "about" is used herein to mean a value −or +20% of a given numerical value. Thus, "about 60%" means a value of between 60−(20% of 60) and 60+(20% of 60) (i.e., between 48 and 70). When "about" is used before a list of numbers, "about" is understood to refer to each member of the list individually. Thus, "about 60%, 70%, or 80%" is understood to mean "about 60%, about 70%, or about 80%." Similarly, the term "at least" is understood to refer individually to each member of any list which it modifies.

The terms "comprising" and "consisting of" are understood to have their ordinary meanings in the field of patent law. That is, "comprising" is understood to be open language, allowing the addition of components not specifically enumerated; whereas "consisting of" is understood to be closed language, which does not contemplate the addition of components not specifically enumerated.

Reference throughout this specification to "one embodiment," "an embodiment," or similar language means that a particular feature, structure, or characteristic described in connection with the embodiment is included in at least one embodiment of the presently claimed invention. Thus, appearances of the phrases "in one embodiment," "in an embodiment," and similar language throughout this specification may, but do not necessarily, all refer to the same embodiment.

Furthermore, the described features, structures, or characteristics of the claimed invention may be combined in any suitable manner in one or more embodiments. In the description, numerous specific details are provided. One skilled in the relevant art will recognize, however, that the claimed invention can be practiced without one or more of the specific details, or with other methods, components, materials, and so forth. In other instances, structures, materials, or operations that are known in the art are not shown or described in detail to avoid obscuring aspects of the claimed invention.

The presently claimed invention may be embodied in other specific forms without departing from its spirit or essential characteristics. The described embodiments are to be considered in all respects only as illustrative and not restrictive. The scope of the claimed invention is, therefore, indicated by the appended claims rather than by the foregoing description. All changes which come within the meaning and range of equivalency of the claims are to be embraced within their scope.

What is claimed is:

1. An instrument comprising:
   a fluid channel fluidly connected to at least a first fluid reservoir and a second fluid reservoir, wherein the fluid channel comprises a capillary tube;
   a counter electrode (CE), a reference electrode (RE), and a working electrode (WE); and
   a potentiostat; wherein:
   the CE, RE, and WE are all disposed within the capillary tube;
   the potentiostat is isolated from earth ground by at least one isolator and is powered by a floating power supply;
   the CE, RE, and WE are each electrically connected to the potentiostat; and
   an access hole defined within a wall of the capillary tube, wherein the RE is removably disposed within the access hole.

2. The instrument of claim 1, further comprising at least a first lead and at least a second lead.

3. The instrument of claim 2, wherein the first lead is disposed in the first fluid reservoir.

4. The instrument of claim 2, wherein the first lead is disposed in the second fluid reservoir.

5. The instrument of claim 2, wherein the at least a first lead and at least a second lead create a high-voltage electric field across the capillary tube.

6. The instrument of claim 5, wherein the high-voltage electric field is a field of about 100 V/cm to about 3000 V/cm.

7. The instrument of claim 1, wherein the capillary tube is a microchannel or a nanochannel.

8. The instrument of claim 1, wherein each of the CE, RE, and WE independently comprises Ti, Au, Pt, C, or Ag.

9. The instrument of claim 1, wherein the capillary tube is made from a material which is an insulator.

10. The instrument of claim 1, wherein the capillary tube is made from a polymer, an epoxy, glass, or fused silica.

11. The instrument of claim 1, wherein each of the CE, RE, and WE independently is less than 300 µm wide.

12. The instrument of claim 1, wherein the CE, RE, and WE are all disposed within 1 mm of each other.

13. The instrument of claim 1, wherein the CE, RE, and WE are all disposed within 0.5 mm of each other.

14. The instrument of claim 1, wherein the at least one isolator is a galvanic isolator.

15. The instrument of claim 1, wherein the floating power supply is a battery.

16. The instrument of claim 1, wherein the CE, RE, and WE are all disposed within the capillary tube at a distance from each end of the capillary tube equal to at least an eighth of a length of the capillary tube.

17. The instrument of claim 1, wherein the CE and WE are disposed on a surface of the capillary tube opposite the access hole, such that when the RE is disposed within the access hole, the RE is oriented:
   generally perpendicular to the CE and WE; and
   above a gap between the CE and WE.

18. The instrument of claim 17, wherein the access hole is disposed:
   at approximately a midpoint of the capillary tube between a first end and second end of the capillary tube; or
   at approximately a quarter length of the capillary tube away from either the first end or the second end of the capillary tube.

19. The instrument of claim 1, wherein the potentiostat comprises:
   a first operational amplifier (op amp) having an output connected to the CE and at least one input connected to a virtual ground, wherein the virtual ground is a local potential in a fluid within the capillary tube;
   a second op amp having at least one input connected to the RE; and
   a third op amp having a first input connected to the WE and a second input connected to the virtual ground.

20. The instrument of claim 1, wherein a fluid flows freely from the first fluid reservoir through the capillary tube into the second fluid reservoir without leaking from the instrument.

21. An instrument comprising:
   a fluid channel fluidly connected to at least a first fluid reservoir and a second fluid reservoir, wherein the fluid channel comprises a capillary tube;
   a counter electrode (CE), a reference electrode (RE), and a working electrode (WE); and
   a potentiostat; wherein:
   the CE, RE, and WE are all disposed within the capillary tube;
   the potentiostat is isolated from earth ground by at least one isolator and is powered by a floating power supply;
   the CE, RE, and WE are each electrically connected to the potentiostat;
   the CE and WE are oriented in an opposed configuration such that the CE and WE extend into the capillary tube from opposing sides of the capillary tube;
   the CE extends through only one wall of the capillary tube; and
   an access hole defined within a wall of the capillary tube, wherein the RE is removably disposed within the access hole.

22. The instrument of claim 21, wherein:
   each of the CE and WE are disposed within the capillary tube at approximately a same distance from an end of the capillary tube;
   the WE extends through only one wall of the capillary tube; and an end of the CE and an end of the WE terminate within the capillary tube forming a gap between the end of the CE and the end of the WE.

\* \* \* \* \*